(12) United States Patent
Nishii et al.

(10) Patent No.: US 6,513,883 B2
(45) Date of Patent: Feb. 4, 2003

(54) HYDRAULIC BRAKE FOR A VEHICLE

(75) Inventors: Michiharu Nishii, Toyota (JP); Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/942,998

(22) Filed: Aug. 31, 2001

(65) Prior Publication Data

US 2002/0033640 A1 Mar. 21, 2002

(30) Foreign Application Priority Data

Aug. 31, 2000 (JP) .......................................... 2000-262585

(51) Int. Cl.[7] .............................. B60T 8/34; B60T 13/00
(52) U.S. Cl. ................... 303/114.1; 188/35.6; 188/358; 303/113.1; 303/50; 60/547.1; 60/562
(58) Field of Search ............................. 303/113.1, 6.01, 303/114.1, 50, 52, 114.2, 114.3; 188/356, 357, 358, 359, 345, 151 R; 60/547.1, 581, 562

(56) References Cited

U.S. PATENT DOCUMENTS 5,029,951 A   7/1991   Nishii

2001/0047914 A1 * 12/2001 Ishida et al. ............ 188/151 R
2002/0000751 A1 *  1/2002 Nishii et al. ............ 303/113.1
2002/0026795 A1 *  3/2002 Nishii et al. ............. 60/547.1
2002/0033640 A1 *  3/2002 Nishii et al. ............ 303/113.1
2002/0060110 A1 *  5/2002 Gotoh ..................... 303/114.1

FOREIGN PATENT DOCUMENTS

JP   2-95966   7/1991

* cited by examiner

*Primary Examiner*—Douglas C. Butler
(74) *Attorney, Agent, or Firm*—Burns, Doane, Swecker & Mathis, LLP (57) ABSTRACT

A hydraulic pressure brake device for a vehicle includes a first piston outputting brake pressure generated in a first pressure chamber and a second piston having a larger diameter than that of the first piston and provided rearward of the first piston and forming a second pressure chamber having a larger diameter than that of the first pressure chamber. The hydraulic pressure brake device further includes a valve device closing the second pressure chamber hydraulically when actuation of the first piston and the second piston is assisted by the assisting device and establishing hydraulic communication between the second pressure chamber and the reservoir when the assisting is not carried out. The first pressure chamber is connected with wheel cylinders provided on front wheels through a first hydraulic pressure system and the second pressure chamber is connected with wheel cylinders provided on rear wheels through a second hydraulic pressure system.

20 Claims, 6 Drawing Sheets

HYDRAULIC BRAKE FOR A VEHICLE

This application is based on and claims priority under 35 U.S.C. §119 with respect to Japanese Application No. 2000-262585 filed on Aug. 31, 2000, the entire content of which is incorporated herein by reference.

FIELD OF THE INVENTION

This invention generally relates to a hydraulic brake device for a vehicle. More particularly, the present invention pertains to a hydraulic brake device for a vehicle which includes a dual brake pressure supply circuit for supplying brake pressure from a hydraulic pressure generating device to wheel cylinders provided respective wheels of the vehicle.

BACKGROUND OF THE INVENTION

Various types of the hydraulic brake devices are known. One type of hydraulic brake device generally used includes a dual brake pressure supply circuit for supplying brake pressure from a hydraulic pressure generating device to wheel cylinders provided on each wheel of a vehicle, a master cylinder serving as a hydraulic pressure generating device, and a booster for assisting the actuation of the master cylinder. The booster is a so called servo unit and assists the operation of the master cylinder in response to brake pedal operation.

Known types of boosters include negative pressure boosters or vacuum boosters that are driven by negative pressure supplied from an intake manifold of the engine of the vehicle and hydraulic pressure boosters driven by an auxiliary hydraulic pressure source. In this type of hydraulic pressure brake device, the master cylinder including a piston with a larger diameter is preferable for reducing a brake pedal stroke. However, if the master cylinder including the piston with a larger diameter is used, the booster is required to increase the assisting power for assisting the operation of the master cylinder and also assure the braking force when the booster fails.

U.S. Pat. No. 5,029,951 (corresponding to a Japanese Patent Application published on Apr. 6, 1990 as Toku-Kai-Hei 2 (1990)-95966) discloses a hydraulic brake device provided with a hydraulic booster for assisting the operation of a master cylinder in response to a brake pedal operation by an output pressure of a power hydraulic pressure source (auxiliary hydraulic pressure source). This hydraulic brake device further includes a power piston having a diameter larger than that of a master piston, and a sealed chamber for hydraulically connecting the power piston and the master piston. The master piston is directly actuated in response to brake pedal depression when the booster fails. Also a one-way valve is interposed between a boost pressure chamber in the hydraulic booster and the sealed chamber so that the power piston and the master piston may be mechanically connected when the boost pressure in the hydraulic booster is not increased in response to the brake pedal depression. Accordingly, this hydraulic brake device is able to reduce a brake pedal stroke and avoid the above problems.

However, even with the hydraulic brake device disclosed in U.S. Pat. No. 5,029,951, the master cylinder is connected with the hydraulic booster and the sealed chamber is further added to the hydraulic booster. This increases the axial length of the overall device. Contributing also to this increased axial length is that the hydraulic brake device disclosed in U.S. Pat. No. 5,029,951 includes a tandem master cylinder connected with two brake pressure supply circuits. Accordingly, mounting the hydraulic brake device on the vehicle is difficult due to a limited space in the engine compartment of the vehicle.

A need thus exists for an improved hydraulic brake device for a vehicle that supplies brake pressure to wheel cylinders provided on each wheel of a vehicle through first and second brake pressure circuits. A need also exists for a hydraulic brake having a hydraulic pressure generating device and an assisting device having a reduced axial length for reducing a brake pedal stroke.

SUMMARY OF THE INVENTION

According to an aspect of the present invention, the hydraulic brake for a vehicle comprises a reservoir for storing brake fluid, first and second sets of wheel cylinders each provided on a wheel of the vehicle, and a hydraulic pressure generating device. The hydraulic pressure generating device includes a first piston for increasing a pressure of the brake fluid supplied from the reservoir into a first pressure chamber to supply brake pressure to the first set of wheel cylinders in response to brake pedal depression, and a second piston provided at the rear of the first piston and having a diameter larger than that of the first piston for increasing the pressure of the brake fluid supplied from the reservoir into a second pressure chamber between the first piston and the second piston to supply brake pressure to the second set of wheel cylinders in response to brake pedal depression. An assisting device is provided rearwardly of the second piston for assisting the actuation of the first and second pistons in response to the brake pedal depression. A valve device hydraulically closes the second pressure chamber from the reservoir when the actuation of each of the first and second pistons is assisted by the assisting device, and establishes hydraulic communication between the second pressure chamber and the reservoir when the assisting operation of the assisting device is not carried out. A first brake pressure circuit hydraulically connects the first pressure chamber with the first set of wheel cylinders and a second brake pressure circuit hydraulically connects the second pressure chamber with the second set of wheel cylinders. The assisting device can be either a negative pressure or vacuum booster or a hydraulic pressure booster.

When the first piston is assisted through the second piston by the assisting device, the second pressure chamber is hydraulically sealed by the valve device and then the second piston and the first piston are hydraulically connected. When the assisting operation of the assisting device is not carried out, the second pressure chamber becomes atmospheric pressure by opening of the valve device, and the second piston and the first piston are mechanically connected.

Preferably, the first brake pressure circuit connects the first pressure chamber with the first set of wheel cylinders provided on a pair of wheels located at the front of the vehicle and the second brake pressure circuit connects the second pressure chamber with the second wheel cylinders provided on a pair of wheels located at the rear of the vehicle. Also, the valve device is preferably located in the second piston and is located at the axial center of the second piston.

In accordance with another aspect of the invention, a hydraulic brake device for a vehicle includes a reservoir for storing brake fluid, a first set of wheel cylinders operatively associated with a pair of front wheels of the vehicle, a second set of wheel cylinders operatively associated with a pair of rear wheels of the vehicle, and a hydraulic pressure generating device that includes a first pressure chamber adapted to be communicated with the first set of wheel cylinders, a second pressure chamber adapted to be communicated with the second set of wheel cylinders and positioned rearwardly of the first pressure chamber, a first piston which increases a pressure of the brake fluid supplied from the reservoir to the first pressure chamber during movement of the first piston, and a second piston positioned rearwardly of the first piston and having a diameter larger than that of the first piston which increases the pressure of the brake fluid supplied from the reservoir to the second pressure chamber during movement of the first piston, the second pressure chamber being located between the first and second pistons. An assisting device positioned is rearwardly of the second piston for assisting actuation of the first and second pistons, and a valve device prevents hydraulic communication between the second pressure chamber and the reservoir when the actuation of each of the first and second pistons is assisted by the assisting device, and establishes hydraulic communication between the second pressure chamber and the reservoir non-operation of the assisting device. A first brake pressure circuit hydraulically connects the first pressure chamber with the first set of wheel cylinders, and a second brake pressure circuit hydraulically connects the second pressure chamber with the second set of wheel cylinders.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
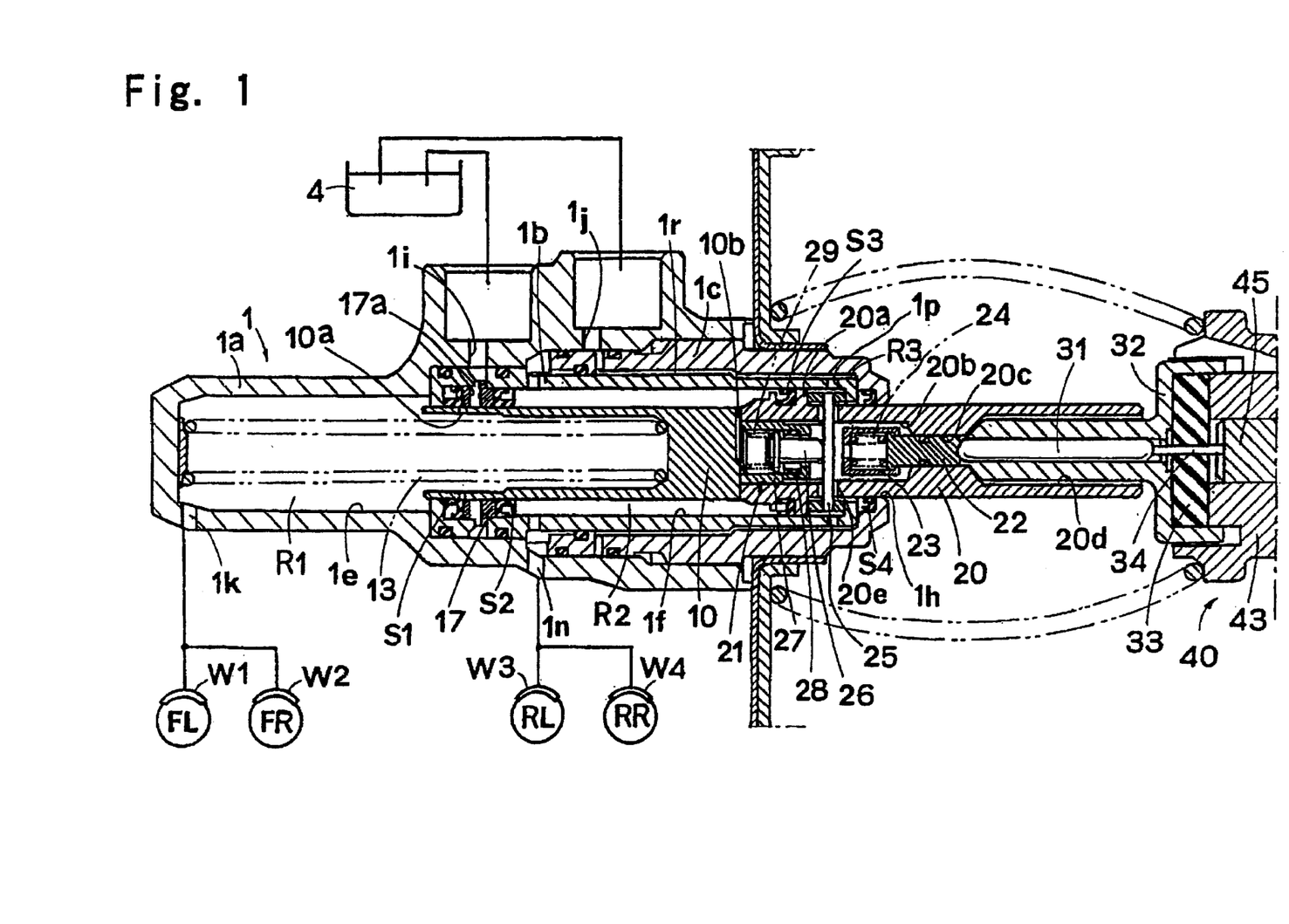
FIG. 1 is a cross-sectional view of a hydraulic pressure generating portion of a hydraulic brake device according to an embodiment of the present invention.
Figure 2:
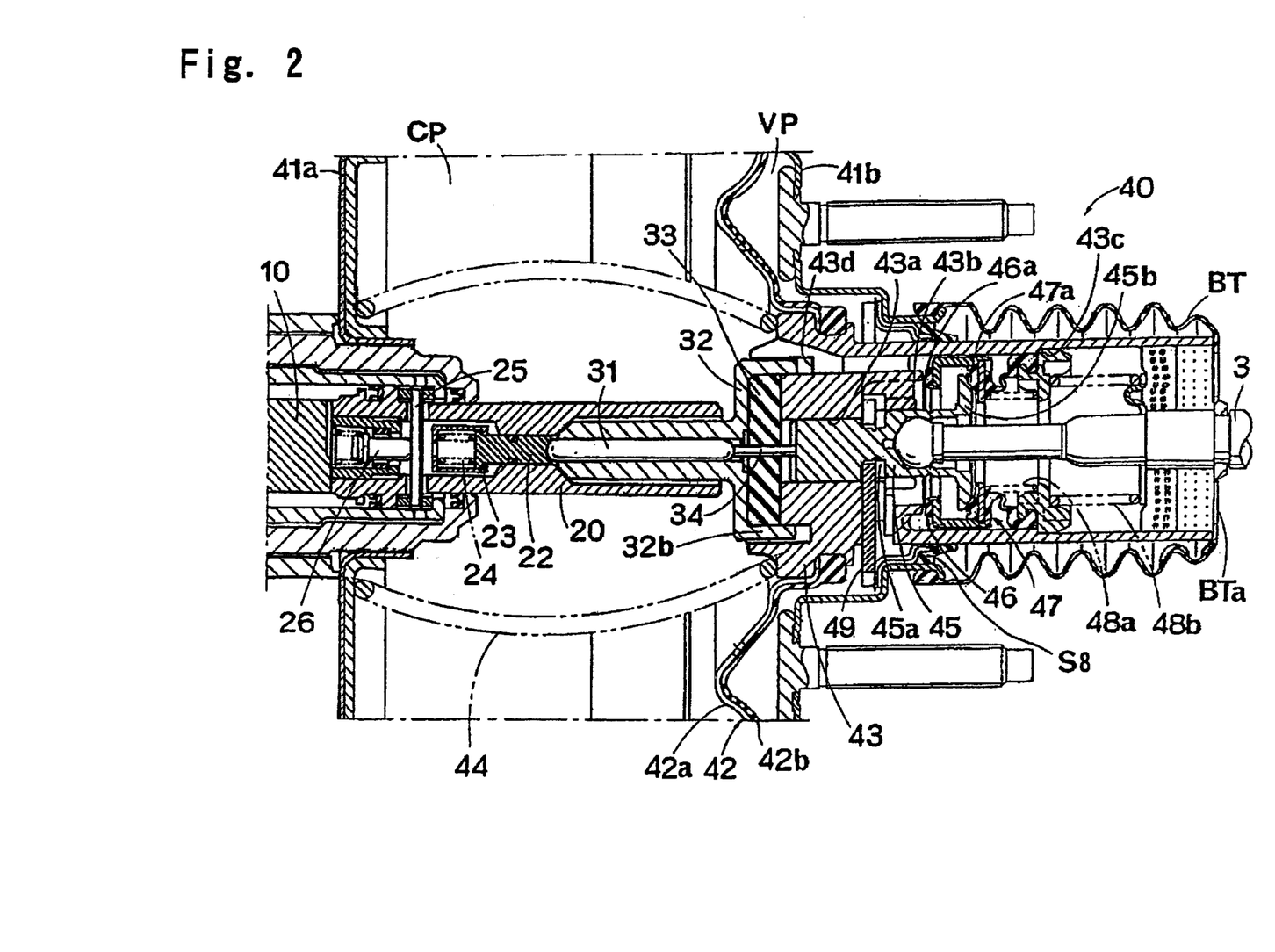
FIG. 2 is a slightly enlarged cross-sectional view of a negative pressure or vacuum booster portion of the hydraulic pressure brake device according to an embodiment of the present invention.

FIGS. 1 and 2 illustrate on embodiment of a hydraulic brake device provided with a negative pressure or vacuum assisting device in accordance with one embodiment of the present invention. A depressing force applied to a brake pedal is transmitted to an input rod 3 as a braking input force. In response to the depression of the brake pedal, brake pressure is generated in a hydraulic pressure generating portion 1 assisted by a negative pressure or vacuum booster 40. The brake pressure is supplied to wheel cylinders W1, W2, W3, W4 provided on each wheel FL, FR, RL, RR of a vehicle. The wheel designated FL is a wheel located at the front left side of the vehicle, the wheel designated FR is a wheel located at the front right side of the vehicle, the wheel designated RL is a wheel located at the rear left side of the vehicle, and the wheel designated RR is a wheel located at rear right side of the vehicle. The hydraulic pressure circuit in the illustrated embodiment is divided into two circuits defining a front-rear split dual brake pressure supply circuit as shown in FIG. 1.

As shown in FIG. 1, the hydraulic pressure generating portion 1 is provided with a housing having a first cylinder 1a, a second cylinder 1b accommodated in the first cylinder 1a, and a third cylinder 1c. A first piston 10 and a second piston 20 are accommodated in series in the housing. The first cylinder 1a has a closed bottom portion at one end and is provided with a stepped bore 1e. The inner diameter of the stepped bore 1e gradually increases from the bottom portion of the cylinder bore 1e toward the opening portion. The second cylinder 1b possesses an approximately cylindrical shape and includes a cylinder bore 1f having a diameter slightly larger than that of the cylinder bore 1e.

The third cylinder 1c possesses a cylindrical shape and accommodates the second cylinder 1b at a hollow portion with an annular hydraulic passage (hydraulic chamber) 1r formed therebetween. A communicating hole 1p connected with the hydraulic passage 1r is formed in the peripheral portion of the second cylinder 1b and a hole 1h slidably supporting the second piston 20 is formed at the bottom portion of the third cylinder 1c.

The first cylinder 1a is provided with fluid supply ports 1i, 1j and output ports 1k, 1n. The output port 1k is connected with a first pressure chamber R1 and the output port 1n is connected with a second pressure chamber R2. The output port 1k is connected with the wheel cylinders W1, W2 provided on the front wheels FL, FR of the vehicle and the output port 1n is connected with the wheel cylinders W3, W4 provided on the rear wheels RL, RR of the vehicle.

An annular member 17 is arranged at the front end portion of the second cylinder 1b accommodated in the first cylinder 1a. The annular member 17 has a communicating hole 17a in the radial direction and cup-shaped sealing members S1, S2, with the communicating hole 17a being connected with the fluid supply port 1i. The first piston 10 having a bottom portion is accommodated in the cylinder bore 1e, and is fluid-tightly and slidably supported by the annular member 17. The first pressure chamber R1 is defined between the first cylinder 1a and the first piston 10.

The second piston 20 possesses a cylindrical shape, is accommodated in the cylinder bore 1f, and is fluid-tightly and slidably supported by the hole 1h at the bottom or end portion of the third cylinder 1c. The second pressure chamber R2 is defined between the first piston 10 and the second piston 20. At the rear end position of the first piston 10 under non-operated condition, a communicating hole 10a is formed on a skirt portion of the first piston 10 facing the communicating hole 17a of the annular member 17. The first pressure chamber R1 is connected with a reservoir 4 through the fluid supply port 1i.

A spring 13 is disposed between the front end surface in the first cylinder 1a and the recessed base surface of the first piston 10. The first piston 10 is always biased in the rear direction (i.e., toward the right in FIG. 1) by the spring 13. Further, a groove 10b is provided on the rear end surface of the first piston 10 and, as explained in more detail later, even when the first piston 10 is in contact with the front end surface of the second piston 20, the connection of the hydraulic passage with a hollow portion 20b is assured.

The second piston 20 possesses a cylindrical shape and includes an enlarged diameter at the front end portion which provides a land portion 20a. This land portion 20a includes an effective cross-sectional area which is larger than that of the first piston 10 that is slidably movable in the annular member 17. A cup-shaped sealing member S3 is provided in front of the land portion 20a and is accommodated in a fluid-tight and slidable manner in the cylinder bore 1f. Accordingly, the second pressure chamber R2 is defined between the inner surface of the cylinder bore 1f and the outer surface of the second piston 20, and between the two sealing members S2, S3. The second piston 20 includes hollow portions 20b, 20c, 20d extending in the axial direction. The hollow portions 20b, 20d have larger diameters and are formed at both sides in the axial direction of another hollow portion 20c having a smaller diameter. Further, axially elongated holes 20e are formed rearward of the land portion 20a. The axially elongated holes 20e communicate with the hollow portion 20b and are formed on the top and bottom portions of the second piston 20 as shown in FIG. 1. The second piston 20 is supported in a fluid-tight and slidable manner in the bore 1h of the third cylinder 1c at the rear of the land portion 20a through a cup-shaped sealing member S4.

A valve device is provided in the second piston 20. First, a plunger 22 is supported in a fluid-tight and slidable manner in the hollow portion 20c and a shock absorbing member 23 is formed at the front end of the plunger 22. The rear end of the shock absorbing member 23, which possesses a cylindrical shape, is engaged with the front end of the plunger 22. The shock absorbing member 23 is always biased in the direction away from the plunger 22 by a spring 24. Accordingly, even when the movement of the shock absorbing member 23 is prevented at the front end, the plunger 22 can be independently moved forward by overcoming the force of the spring 24.

A pin 25 is positioned in the elongated holes 20e formed on the top and bottom portions of the piston 20 and are axially movable therein. The pin 25 is provided in front of the shock absorbing member 23. When the shock absorbing member 23 is in contact with the pin 25, backward pressure (pressure towards a valve seat 28) by brake pressure in the second pressure chamber R2 affecting an open-close valve 26 is larger than the biasing force generated by the spring 24.

Second, a valve apparatus 21 is positioned in front of the pin 25 and is included in the hollow portion 20b. The valve apparatus 21 is provided with a case 27 having a bottom portion at one end and accommodating therein the open-close valve 26. The open-close valve 26 has a flange potion at its front end and is movably supported in the axial direction within the case 27. The rear end of the axial portion of the open-close valve 26 is extendable rearward from the case 27 in order to contact the pin 25. At the rear end of the case 27, the valve seat 28 is formed to be in contact with the flange portion of the open-close valve 26. Further, a spring 29 is provided in the case 27 in front of the open-close valve 26 and biases the flange portion of the open-close valve 26 towards the valve seat 28. Accordingly, when the pin 25 is positioned at the rear end of the elongated holes 20e, the flange portion is kept in contact with the valve seat 28. The force of the spring 29 is set to be smaller than that of the spring 24. When the open-close valve 26 is pushed by the shock absorbing member 23 through the pin 25 under the free condition, the spring 24 is not compressed but only the spring 29 is compressed. Accordingly, the flange portion of the open-close valve 26 is separated from the valve seat 28.

Figure 3:
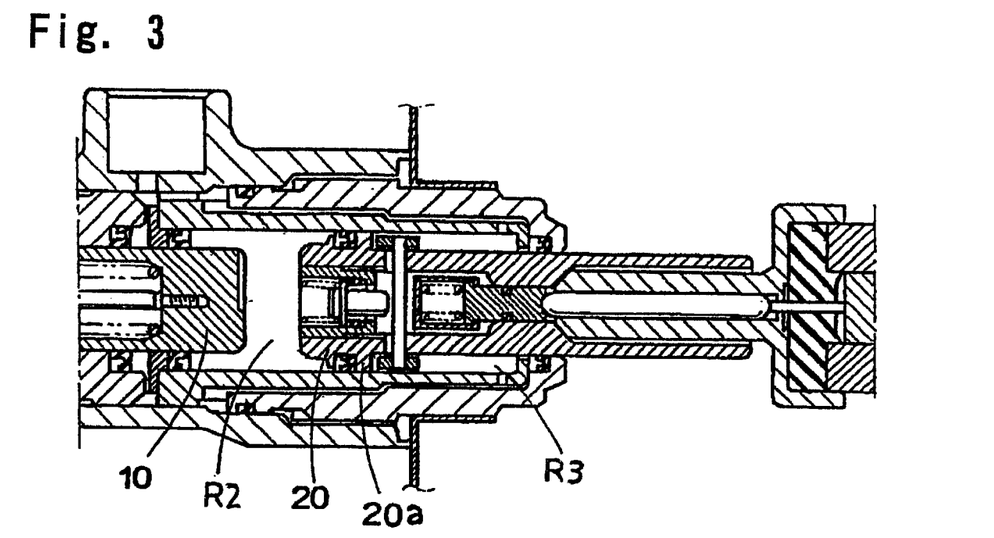
FIG. 3 is an enlarged cross-sectional view of the first and second piston portions under a condition in which assisting by the negative pressure or vacuum booster is operated.

With respect to the valve device, under the condition in which the brake is not operated as shown in FIG. 1, the second pressure chamber R2 is connected with the reservoir 4 through the valve seat 28, the elongated holes 20e, the communicating hole 1p, the hydraulic passage 1r, and the fluid supply port 1j by the opening end in front of the case 27. Under the brake-operated condition when the second piston 20 is moved forward by the operation of the hydraulic pressure booster 40 and the pin 25 is movable in the elongated holes 20e, the open-close valve 26 is moved backward with the rear end being in contact with the pin 25 by the force of the spring 29. Then, when the flange portion of the open-close valve 26 is in contact with the valve seat 28, the communication between the second pressure chamber R2 and the hydraulic passage 1r is interrupted. Accordingly, when the flange portion of the open-close valve 26 is in contact with the valve seat 28, the second pressure chamber R2 forms a hydraulically sealed space filled with brake fluid, and the first piston 10 and the second piston 20 are a hydraulically connected unit. At this time, because the effective cross-sectional area of the land portion 20a of the second piston 20 is larger than that of the first piston 10, in accordance with the forward movement of the second piston 20, a gap is formed between the rear end surface of the first piston 10 and the front end surface of the second piston 20, and the second pressure chamber R2 is as shown in FIG. 3. In this condition, the first piston 10 and the second piston 20 are further moved forwardly.

Whereas, for instance, when a brake is operated under the second piston 20 being stopped and the plunger 22 is moved forward relative to the second piston 20, the shock absorbing member 23 contacts the pin 25. When the plunger 22 is further moved forward, the open-close valve 26 is moved forward through the shock absorbing member 23 and the pin 25, with the valve 26 being separated from the valve seat 28. Then the second pressure chamber R2 is connected with the hydraulic passage 1r and assumes the condition shown in FIG. 4.

Further, a first transmitting member 31 transmitting the depression force of the brake pedal and a second transmitting member 32 transmitting the driving force of the negative pressure booster 40 are accommodated in the hollow portion 20d at the rear of the second piston 20. The first transmitting member 31 and the plunger 22 are configured to together constitute a brake input transmitting member. The first transmitting member 31 is configured in the form of a rod having a front end in contact with the rear end of the plunger 22 and a rear end connected with a plunger 45 through a transmitting pin 34 that penetrates or passes through a reaction rubber disc 33. The second transmitting member 32 is operatively connected with a driving member 43 through the reaction rubber disc 33.

As shown in FIG. 2, the negative pressure booster 40 is provided with housing parts or shells 41a, 41b that are interconnected to each other with an intermediately located movable wall 42 that is sealed with respect to the shells 41a, 41b. A constant pressure chamber (negative pressure chamber) CP is defined forward in the negative pressure booster 40 (i.e., on the front side of the movable wall 42) and a variable pressure chamber VP is defined rearward in the negative pressure booster 40 (i.e., on the rear side of the movable wall).

The constant pressure chamber CP is connected with a negative pressure source such as an intake manifold through an inlet and a negative pressure is maintained in the constant pressure chamber CP. The movable wall 42 is provided with a pressure receiving plate 42a and a diaphragm 42b. One opening end portion of the cylindrical driving member (power piston) 43 is fixed hermetically in the middle or central portion of the movable wall 42 while the other side of the opening end portion extends rearward through the housing 41b.

The driving member 43 is slidably supported by the opening portion of the housing 41b through a seal member S8 and is enclosed by a boot BT. The boot BT is fixed to the input rod 3 and a communicating hole BTa is provided at the opening end portion of the driving member 43. A spring 44 is disposed between the front end portion of the driving member 43 and the inner surface of the housing 41a. The movable wall 42 is thus biased rearwardly with respect to the housing 41b by the spring 44.

The input rod 3 is positioned in the axial central portion of the driving member 43. The front end portion of the input rod 3 is connected with the plunger 45 through a ball joint. The plunger 45 is slidably supported by an axially extending communicating hole 43a formed in the driving member 43. A valve seat 43b is formed on the periphery of the communicating hole 43a. A first control valve mechanism 46 is disposed in the driving member 43, encloses the valve seat 43b and biases an annular valve portion 46a to be in contact with the valve seat 43b. The first control valve mechanism 46 (a control valve) is provided with a valve seat 45b at the rear end portion of the plunger 45.

A second control valve mechanism 47 is connected with the first control valve mechanism 46 and biases an annular valve portion 47a to be in contact with the valve seat 45b. The second control valve mechanism 47 (an air valve) is formed by the valve portion 47a provided at the front end of a cylindrical elastic member. The second control valve mechanism 47 is biased toward the valve seat 43b by a spring 48a supported at the rear end of the second control valve mechanism 47. The rear end of the elastic member forming the second control valve mechanism 47 is also biased toward the valve seat 43b by a spring 48b and supported by a stepped portion 43c formed inside the driving member 43.

The rear part of the sliding portion formed at the end region of the plunger 45 is provided with an annular small diameter portion 45a. A key member 49 is disposed in the small diameter portion 45a and is movable over a predetermined distance in the axial direction. The key member 49 extends outwardly beyond the outer periphery of the driving member 43 and is engaged with the housing 41b to restrict rearward movement of the plunger 45 in the axial direction. This defines the returning position of the movable wall 42.

A recess portion 43d is formed at the front of the driving member 43. The rear end portion 32b of the second transmitting member 32 which accommodates the reaction rubber disc 33 is disposed in the recess portion 43d. The front end of the transmitting pin 34 is in contact with the rear end of the first transmitting member 31 while the rear end of the transmitting pin 34 is in contact with the end surface of the plunger 45. The transmitting pin 34 penetrates or passes through the reaction force rubber disc 33 and is movably supported in the axial direction.

Accordingly, with the negative pressure booster 40 being operated, when the pushing force of the movable wall 42 is increased to a predetermined value by the pressure increase in the variable pressure chamber VP (i.e., the creation of a pressure differential between the constant pressure chamber CP and the variable pressure chamber VP by virtue of the introduction of atmospheric air into the variable pressure chamber VP), the portion of the reaction rubber disc 33 facing the plunger 45 expands or deforms rearward and contacts the end surface of the plunger 45. The rearward reaction force in response to the pushing force of the movable wall 42 is applied to the plunger 45. Based on a difference between the reaction force and the operation force added to the input rod 3, the first control valve mechanism 46 and the second control valve mechanism 47 are controlled.

Referring now to FIGS. 1 and 2, the operation of the hydraulic pressure brake device of the present embodiment is as follows. When the brake pedal is not operated, each component maintains the position shown in FIGS. 1 and 2. That is, the negative pressure booster 40 is under the non-operated condition. The second control valve mechanism 47 is closed since the valve portion 47a is in contact with the valve seat 45b. Thus, the introduction of atmospheric air into the variable pressure chamber VP is interrupted or prevented. At this time, the first control valve mechanism 46 receives only the negative pressure in the constant pressure chamber CP.

When the input rod 3 is pushed forward by the operation of the brake pedal, the input rod 3 and the plunger 45 are moved forward, overcoming the force of the spring 48b when the total of the operation force applied to the input rod 3 and the pushing force to the input rod 3 caused by the pressure differential between the variable pressure chamber VP and the constant pressure chamber CP becomes larger than the force of the spring 48b. The valve portion 46a of the first control valve mechanism 46 is in contact with the valve seat 43b of the driving member 43 and the communication between the variable pressure chamber VP and the constant pressure chamber CP is interrupted. The valve portion 47a of the second control valve mechanism 47 is separated from the valve seat 45b and the atmospheric air is introduced into the variable pressure chamber VP through the communicating hole BTa of the boot BT. The pressure in the variable pressure chamber VP is thus increased. Accordingly, a force pushing the movable wall 42 forward is generated and the second piston 20 is moved forward through the driving member 43, the reaction force rubber disc 33 and the second transmitting member 32. Further, the first piston 10 is moved forward.

In this case, corresponding to the forward movement of the second piston 20, the open-close valve 26 is in contact with the valve seat 28 and the second pressure chamber R2 becomes hydraulically sealed. When the second piston 20 is driven forward by the assisting operation of the negative pressure booster 40 under this condition, the pressure moving the open-close valve 26 rearward (the pressure toward the valve seat 28) by the brake pressure in the second pressure chamber R2 is increased. The open-close valve 26 is thus kept in contact with the valve seat 28. Accordingly as shown in FIG. 3, a hydraulic chamber R3 is formed between the rear end surface of the first piston 10 and the front end surface of the second piston 20 in the bore 1f. Accordingly, the first piston 10 and the second piston 20 are hydraulically connected through the brake fluid filled in the second pressure chamber R2 and both pistons 10, 20 move forward as a unit. At this time, the hydraulic pressure in response to the effective cross-sectional area (a cross-sectional area of a column) of the land portion 20a of the second piston 20 is outputted to the wheel cylinders. In this manner, the assisting operation is conducted by the negative pressure booster 40 and the input-output characteristics are shown in FIG. 5.

Figure 5:
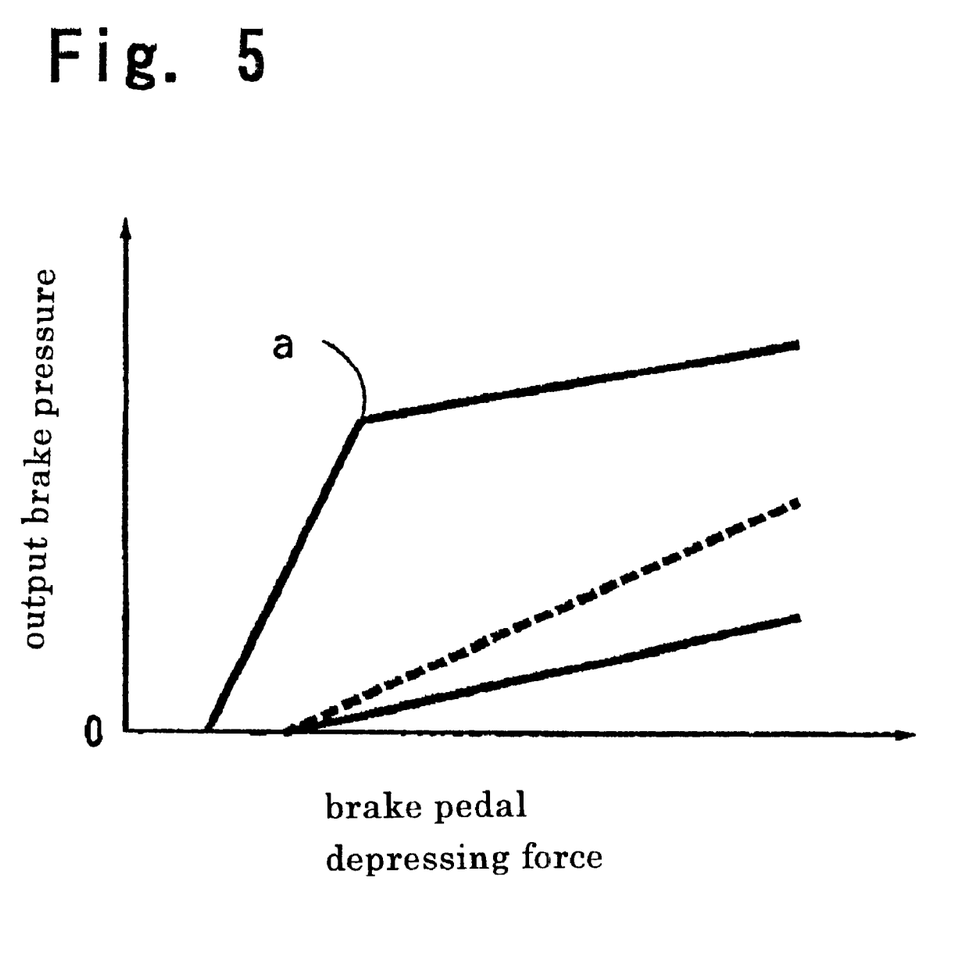
FIG. 5 is a graph showing the input-output characteristics associated with the hydraulic brake device of the present invention.

FIG. 5 is a graph illustrating the relationship between the depression force of the brake pedal and the outputting force (the output brake pressure of the hydraulic pressure generating portion 1). The upper solid line in FIG. 5 shows the characteristics when the negative pressure booster 40 is operated and the lower solid line shows the characteristics of a conventional booster upon failure. The dashed line in FIG. 5 shows the characteristics under failure of the booster according to the present embodiment. In FIG. 5, when the brake pedal force is increased to a point "a", the assisting operation by the negative pressure booster 40 reaches the assisting limit.

Further, when the hydraulic pressure booster 40 reaches the assisting limit (i.e., point "a" in FIG. 5) and the brake pedal is further depressed, the input rod 3 is moved forward in response to the brake pedal operation followed by the forward movement of the plunger 45, the transmitting pin 34, the first transmitting member 31, and the plunger 22. When the shock absorbing member 23 is in contact with the pin 25, the pressure pushing the open-close valve 26 rearward (the pressure toward the valve seat 28) by the brake pressure in the second pressure chamber R2 is larger than the force of the spring 24. Accordingly, a gap is maintained between the rear end of the open-close valve 26 being in contact with the valve seat 28 and the pin 25, even though the shock absorbing member 23 is in contact with the pin 25. Under this condition, the plunger 45 of the negative pressure booster 40 is engaged with the key member 49, and the second piston 20 and the first piston 10 are moved forward through the brake fluid filled in the second pressure chamber R2. Accordingly, the input-output characteristics of the device at this stage are shown in the range extending beyond point "a" in FIG. 5.

Figure 4:
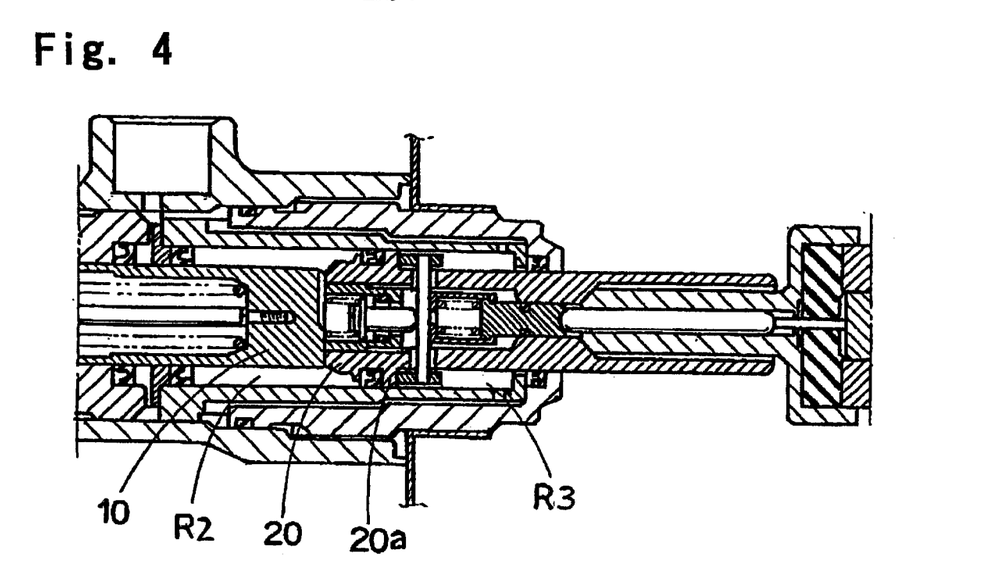
FIG. 4 is a cross-sectional view similar to FIG. 3, but showing the first and second piston portions when the negative pressure or vacuum booster has failed.

When the negative pressure booster 40 fails, the second transmitting member 32 cannot be moved. The second pressure chamber R2 is connected with the reservoir 4 and the pressure therein becomes the atmospheric pressure through the communicating hole 1p, the hydraulic passage 1r, and the port 1j. The input rod 3 is moved forward in accordance with the brake pedal operation, then the second piston 20 is in contact with the first piston 10 and is moved forward integrally with the first piston 10. Briefly stated, when the input rod 3 is moved forward in accordance with the brake pedal operation, the shock absorbing member 23 is in contact with the pin 25 to push the pin 25. In this case, the force of the spring 24 is larger than that of the spring 29, and so the open-close valve 26 is separated from the valve seat 28. The second pressure chamber R2 is thus connected with the reservoir 4 and becomes atmospheric pressure like the pressure in the hydraulic chamber R3 as shown in FIG. 4.

Accordingly, the second piston 20 and the first piston 10 are mechanically connected together and moved forward integrally. The brake pressure outputted in this case is defined not by the effective cross-sectional area of the land portion 20a of the second piston 20, but by the effective cross-sectional area of the first piston 10. As a result, the cross-sectional area of the first piston 10 is smaller than that of the land portion 20a under the assisting condition. The input-output characteristics in this condition are shown in FIG. 5 with the dashed line. As can be seen, the pressure increase gradient associated with the present invention is increased compared to the input-output characteristics associated with known devices represented by the lower solid line. Further, because the first pressure chamber R1 provided between the cylinder 1a and the first piston 10 is connected with the wheel cylinders W1, W2 provided on the front wheels FL, FR which receive a larger braking force, the proper braking force can be assured even when the negative pressure booster 40 fails.

As explained above, the hydraulic brake device is able to reduce the brake pedal stroke by the hydraulic generating portion 1 with a shorter axial length compared to other known devices. Even if the negative pressure booster 40 should fail, the input-output characteristics shown by the dashed line in FIG. 5 can be obtained. That is, even if the negative booster 40 should fail, a braking force larger than that of known devices is outputted and the effective braking force can be obtained. Accordingly, the hydraulic pressure brake device of the present invention is advantageously able to assure the braking force in case of an emergency.

In addition, the transmitting pin 34 extends forward through the reaction rubber disc 33, with the front end of the first transmitting member 31 being in contact with the rear end surface of the first transmitting member 31. Thus, smooth brake operation can be achieved even when the negative pressure booster 40 fails. Because the valve device 21 is provided in the hollow portion 20b of the second piston 20, the valve device can be easily assembled.

Figure 6:
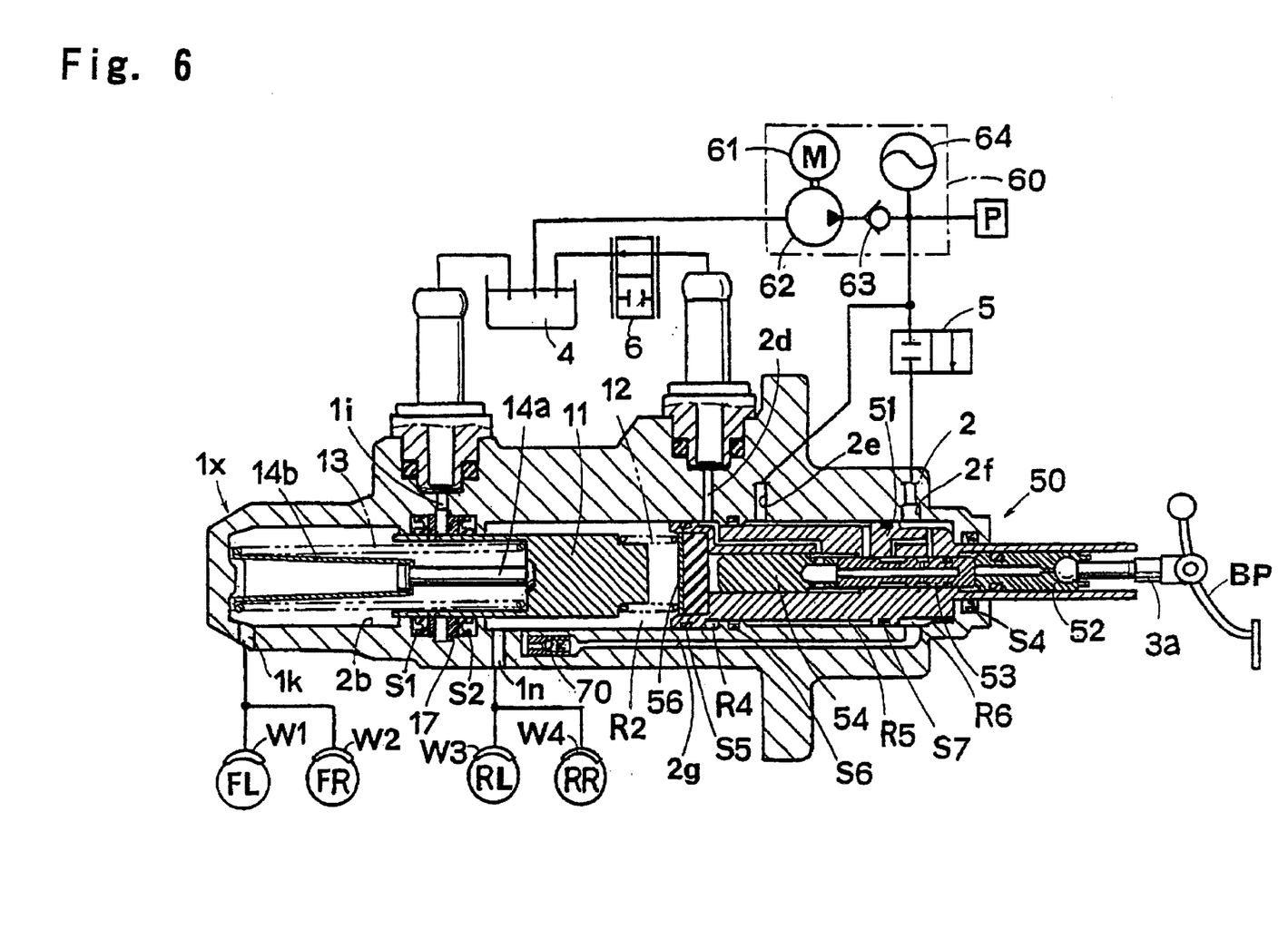
FIG. 6 is a cross-sectional view of the hydraulic brake device according to another embodiment of the present invention.
Figure 7:
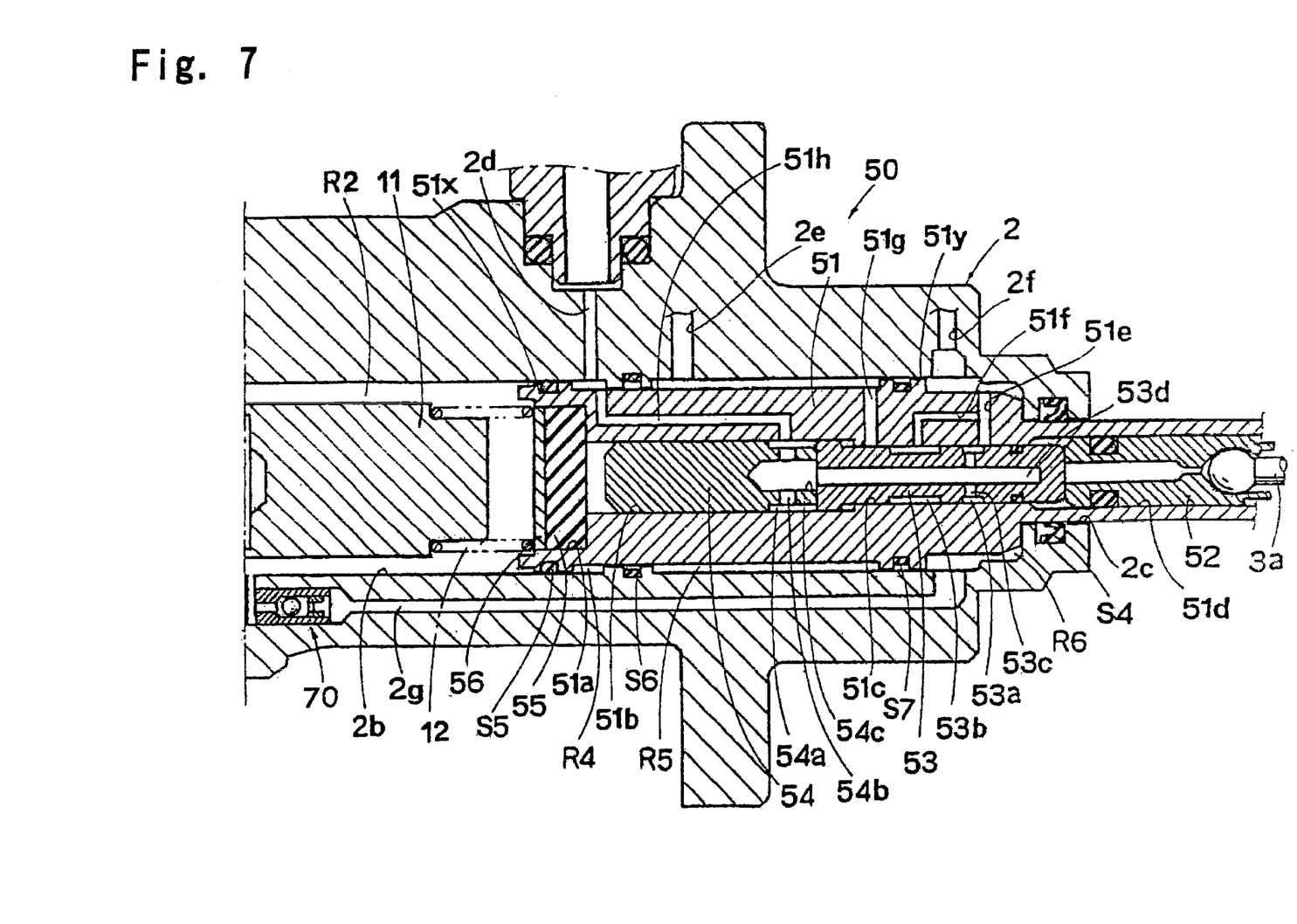
FIG. 7 is a cross-sectional view of a hydraulic pressure assisting portion according to the another embodiment of the present of the invention.

FIGS. 6 and 7 show the hydraulic pressure brake device according to another embodiment of the present invention. As explained above, the negative pressure assisting device (negative pressure or vacuum booster 40) is used as the assisting device in the above embodiment. In this embodiment, the hydraulic pressure assisting device is used as the assisting device. Referring to FIGS. 6 and 7, the depression of the brake pedal added to the brake pedal BP is transmitted as a brake operation force through an input rod 3a. In response to the brake pedal operation, the brake pressure is outputted from a hydraulic pressure generating portion 1x assisted by a hydraulic pressure assisting portion 50. The brake pressure is supplied to the wheel cylinders W1, W2, W3, W4 through two hydraulic pressure systems. For ease in understanding the embodiment shown in FIGS. 6 and 7, the plurality of cylinders forming the hydraulic pressure generating portion are explained as being of a single housing 2, it being understood that the hydraulic pressure generating portion is formed of a plurality of cylinders in much the same way as that described above in connection with the first embodiment. The parts or components of this embodiment that are the same as those in the embodiment described above are identified by the same reference numerals.

The hydraulic pressure generating portion 1x of this embodiment is configured as shown in FIG. 6 and, as mentioned above, is substantially the same in structure as that of the hydraulic pressure generating portion 1 of the above embodiment shown in FIG. 1. However, the shape of the first piston 11 of this embodiment is slightly different from that of the above embodiment shown in FIG. 1. A restriction device is provided at the rear end of the first piston 11 to define the rear end position of the first piston 11. The restriction device includes a rod 14a and a spring retainer 14b. One end of the rod 14a is secured to a recessed base surface of the first piston 11 and the head portion at the other end of the rod 14a is engaged with an end portion of the spring retainer 14b. Accordingly, rearward movement of the first piton 11 is restricted.

The hydraulic pressure assisting portion 50 is formed at the rear of the first piston 11 through the second pressure chamber R2. A second piston 51 is accommodated in a fluid-tight and slidable manner in a cylinder bore 2b. As shown in FIG. 7, a land portion 51x is formed at the front of the second piston 51 while a land portion 51y is formed at the rear of the second piston 51. A respective sealing member S5, S7 is disposed at each land portion 51x, 51y. A sealing member S6 is provided on the inner surface of the cylinder bore 2b at a position between the sealing members S5, S7. A sealing member S4 is provided around a bottom opening portion 2c.

The second pressure chamber R2 is provided between the sealing members S2, S5. In addition, an annular drain chamber R4 is provided between the sealing members S5, S6, an annular fluid supply chamber R5 is provided between the sealing members S6, S7, and an annular power chamber R6 is provided between the sealing members S7, S4. As shown in more detail in FIG. 7, the second piston 51 includes a recessed portion 51a, a larger diameter cylinder bore 51b, a smaller diameter cylinder bore 51c and a larger diameter cylinder bore 51d arranged in that from the front. Further, the second piston 51 includes a communicating hole 51h connecting the cylinder bore 51b with the drain chamber R4, a communicating hole 51g connecting the cylinder bore 51c with the fluid supply chamber R5, and two communicating holes 51e, 51f connecting the cylinder bore 51c with the power chamber R6.

A plunger 52 is accommodated in a fluid-tight and slidable manner in the cylinder bore 51d and the input rod 3a is connected at the rear of the plunger 52. In front of the plunger 52, a first spool 53 is accommodated in a fluid-tight and slidable manner in the cylinder bore 51c. A second spool 54 is slidably accommodated in the cylinder bore 51b in front of the first spool 53. A reaction rubber disc 55 forming an elastic member for transmitting the reaction force is formed at the recess portion 51a as shown in FIG. 7. A metal plate 56 is accommodated in the recess portion 51a in front of the reaction rubber disc 55. The metal plate 56 is movable in the front and rear directions together with the reaction force rubber disc 55. A spring 12 is disposed between the metal plate 56 and the first piston 11 for enabling direct force transmission between the metal plate 56 and the first piston 11. Under the non-operated condition as shown in FIGS. 6 and 7, a small gap is formed between the reaction rubber disc 55 and the front end surface of the second spool 54.

As shown in more detail in FIG. 7, annular grooves 53a, 53b and an axially extending hole 53d having an opening front portion are provided on the outer periphery of the first spool 53. The hole 53d is connected with the annular groove 53a through a radially extending communicating hole 53c. Under the non-operated condition shown in FIG. 7, two annular grooves 53a, 53b in the first spool 53 face respective communication holes 51e, 51f. The power chamber R6 is connected with the hole 53d through the communicating hole 51e, the annular groove 53a and the communicating hole 53c. When the first spool 53 is moved forward, communication between the power chamber R6 and the hole 53d is interrupted. Then the annular groove 53b faces the communication hole 51f and an opening portion of the communicating hole 51g, and the power chamber R6 is connected with the communicating hole 51g.

The rear part of the outer periphery of the second spool 54 is provided with an annular groove 54a. The second spool 54 is also provided with an axially extending hole 54c having an open rear portion. The hole 54c faces the opening portion of the hole 53d of the first spool 53. The axially extending hole 54c in the second spool 54 is connected with the annular groove 54a through the communicating hole 54b in the radial direction and is further connected with the drain chamber R4 through the communicating hole 51h. Under the condition shown in FIG. 7, the first spool 53 and the second spool 54 are in contact with each other and move integrally. However, the first spool 53 and the second spool 54 can be separated so that a gap is formed between the first spool 53 and the second spool 54.

A drain port 2d and two input ports 2e, 2f always connected with the drain chamber R4 are provided in the housing 2. As shown in FIG. 6, the drain port 2d is connected with the reservoir 4 through a normally-open type valve 6. The normally-open type valve 6 is configured with a linear solenoid type valve for conducting a sensitive control. The input ports 2e, 2f are connected with an auxiliary hydraulic pressure source 60 as shown in FIG. 6.

The auxiliary hydraulic pressure source 60 includes a hydraulic pressure pump 62 driven by an electric motor 61. The input side of the auxiliary hydraulic pressure source 60 is connected with the reservoir 4. The output side of the hydraulic pressure pump 62 of the auxiliary hydraulic pressure source 60 is connected with an accumulator 64, and is connected with the input port 2e through a one-way valve 63 and with the input port 2f through a normally-closed type valve 5. If the normally-closed type valve 5 is configured with the linear solenoid type valve, more sensitive control is available. In this embodiment, the accumulator 64 is connected with a pressure sensor P so that the auxiliary hydraulic pressure source 60 can be maintained as a predetermined output hydraulic pressure.

In the present embodiment, the housing 2 is provided with a hydraulic passage 2g connecting the second pressure chamber R2 with the power chamber R6. A normally-open type check valve 70 (referred to hereinafter as a check valve 70) is positioned in the hydraulic passage 2g. The check valve 70 is normally open and is closed in response to the pressure differential between the power chamber R6 and the second pressure chamber R2. When the pressure in the power chamber R6 is larger than that of the second pressure chamber R2 and the pressure differential therebetween is larger than a predetermined value, the check valve 70 is closed. As a result, fluid communication between the power chamber R6 and the second pressure chamber R2 is interrupted. On the other hand, when the hydraulic pressure brake device is not operated, the check valve 70 is open since no pressure is generated both in the power chamber R6 and the second pressure chamber R2. Accordingly, easy and reliable air bleeding from the second pressure chamber R2 can be performed when the brake fluid is introduced by abstracting vacuum from the power chamber R6.

The operation of the hydraulic pressure brake device shown in FIGS. 6 and 7 is as follows. When the brake pedal BP is not operated, each component is under the condition shown in FIGS. 6 and 7. The normally closed valve 5 is in the closed position, and the normally open valve 6 is in the open position. The hydraulic pressure assisting portion 50 is under the non-operated condition. At this time, the fluid supply chamber R5 is connected with the accumulator 64 of the auxiliary hydraulic pressure source 60 while the communicating hole 51g is interrupted by the first spool 53. When the normally closed valve 5 is in the closed position, the power chamber R6 is connected with the reservoir 4 through the communicating hole 51e, the groove 53a of the first spool 53 facing the communicating hole 51e, the communicating hole 53c, the hole 53d, the hole 54c of the second spool 54, the communicating hole 54b, the groove 54a, the communicating hole 51h of the second piston 51, and the port 2d. Further, the power chamber R6 is connected with the second pressure chamber R2 through the hydraulic passage 2g and the one-way valve 70. Accordingly, even when the auxiliary hydraulic pressure source 60 is driven, only rearward pushing force is applied to the second piston 51 by the hydraulic pressure in the fluid supply chamber R5 to thereby maintain the second piston at the original position shown in FIGS. 6 and 7.

When the brake pedal is depressed, the first spool 53 is moved forward by the forward movement of the plunger 52, and the communicating hole 51e is blocked or interrupted by the first spool 53. The communication between the power chamber R6 and the hole 53d is accordingly interrupted. On the other hand, because the annular groove 53b faces the opening portion of the communicating holes 51f, 51g, the power hydraulic pressure is introduced into the power chamber R6 through the input port 2e, the communicating hole 51g, the annular groove 53b, and the communicating holes 51e, 51f. In this case, the power hydraulic pressure is introduced into the fluid supply chamber R5 from the auxiliary hydraulic pressure source 60. Accordingly, the pushing force against the annular area (serving as a pressure receiving surface in the rear direction) of the land portion 51y is added in the rearward direction, i.e., the direction in which the second piston 51 is moved by the power hydraulic pressure. The pushing force is balanced with the pushing force of the effective cross-sectional area of the second piston 51 by the power hydraulic pressure introduced into the power chamber R6 in response to the brake operation and the brake operation force. At this time, when the pressure differential between the power chamber R6 and the second pressure chamber R2 is larger than a predetermined value, the one-way valve 70 is closed and the hydraulic passage 2g is interrupted by the one-way valve 70. Accordingly, the second pressure chamber R2 becomes a sealed space filled with the brake fluid.

As explained above, when the second pressure chamber R2 becomes a sealed space and the assisting is under the operated condition, the pushing force against the annular area of the land portion 51y and the pushing force added to the front end surface of the second piston 51 by the pressure of the second pressure chamber R2 are controlled to maintain the balance with the brake operation force and the pushing force added to the rear end surface of the second piston 51. Because the effective cross-sectional area of the land portion 51x of the second piston 51 is larger than that of the first piston 11, the first piston 11 is moved forward in response to the forward movement of the second piston 51 and the gap between the first and second pistons 11, 51 becomes larger. In this condition, the first piston 11 and the second piston 51 are hydraulically connected and moved together. Accordingly, in this embodiment, the second piston 51 and the first piston 11 are hydraulically connected through the brake fluid filled in the second pressure chamber R2 when the assistance by the hydraulic pressure assisting portion 50 is performed. Because the second piston 51 and the first piston 11 are moved forward integrally under the condition of the first piston 11 being advanced by the gap between the second piston 51 and the first piston 11, the stroke of the brake pedal BP is reduced.

In the event the hydraulic pressure assisting portion 50 fails, the power hydraulic pressure is not supplied to the fluid supply chamber R5 and the power chamber R6. Because the drain chamber R4 is connected with the reservoir 4 through the port 2d and also the second pressure chamber R2 is connected with the reservoir 4 through the port 1i, the drain chamber R4 and the second pressure chamber R2 are maintained with atmospheric pressure. Accordingly, when the input rod 3a is moved forward by the operation of the brake pedal BP, the second spool 54 is in contact with the reaction force rubber disc 55 through the plunger 52 and the first spool 53. The first piston 11 is then pushed by way of the reaction force rubber disc 55, the metal plate 56 and the spring 12. The plunger 52, the first spool 53, the second spool 54, the reaction force rubber disc 55, the metal plate 56, the spring 12 and the first piston 11 are integrally moved forward. Accordingly, the second piston 51 and the first piston 11 are integrally moved forward. The brake pressure outputted in this case is defined not by the effective cross-sectional area of the land portion 51x of the second piston 51, but by that of the first piston 11. Even when the hydraulic pressure assisting portion 50 fails, a pressure increase gradient can be increased compared to that which arises with the effective cross-sectional areas of the first piston 11 and the second piston 51 being the same.

In this embodiment, active braking (automatic braking) is also available. In this case, with the brake pedal BP not being operated, the auxiliary hydraulic pressure source 60 is actuated with the normally closed valve 5 in the open position and the normally open valve 6 in the closed position. At the initial position, the first spool 53 and the second spool 54 are in the same positional relationship as in FIG. 7. Then the communicating hole 51g is interrupted by the first spool 53, and the output power hydraulic pressure of the auxiliary hydraulic pressure source 60 is added to the fluid supply chamber R5. The power chamber R6 is connected with the communicating hole 51e, the groove 53a of the first spool 53 facing the communicating hole 51e, the communicating hole 53c, the hole 53d, the hole 54c of the second spool 54, the communicating hole 54b, the groove 54a, the communicating hole 51h of the second piston 51 and the port 2d. The space therebetween is filled with brake pressure (power hydraulic pressure) in the power chamber R6 because the normally open valve 6 is in the closed position. Accordingly, the first spool 53 receives equal pressure at both ends and the condition is maintained. On the other hand, the second spool 54 is moved forward by the operation of the power hydraulic pressure and the reaction rubber disc 55 is pushed. Accordingly, a gap is formed between the first spool 53 and the second spool 54.

In this case also, the check valve 70 is in the closed position by the pressure differential between the power chamber R6 and the second pressure chamber R2. The hydraulic passage 2g is interrupted by the one-way valve 70. When the pressure in the second pressure chamber R2 is increased, the second pressure chamber R2 becomes a sealed space because the fluid communication with the port 1i is interrupted. Accordingly, the first piston 11 is moved forward by the pushing force against the effective cross-sectional area of the second piston 51 by brake pressure introduced into the power chamber R6. Then, with the brake pedal BP not being operated, the desirable brake pressure can be outputted due to the appropriate control of the auxiliary hydraulic pressure source 60, the normally closed valve 5, and the normally open valve 6. Meanwhile, the brake pressure in the second pressure chamber R2 is transmitted to the brake pedal BP through the metal plate 56 and the reaction rubber disc 55, and the reaction force is added to the BP brake pedal.

In addition to the foregoing, the brake assist control is also available. For instance, when the brake pedal BP is operated at a speed greater than a predetermined speed, or with a force greater than a predetermined force, the normally closed valve 5 is controlled after the normally open valve 6 is set in the closed position. Accordingly, the output power hydraulic pressure of the auxiliary hydraulic pressure source 60 is supplied to the fluid supply chamber R5 and the power chamber R6. Then, relative movement between the first spool 53 and the second piston 51 is controlled in response to the control of the normally closed valve 5. In this case, a larger brake pressure is outputted as compared to the normal hydraulic pressure assisting, and the effective braking force can be assured in response to the depression force of the brake pedal BP.

As explained above, the hydraulic pressure brake device of the present invention possesses a relatively simple structure yet can reduce the stroke of the brake pedal BP under the hydraulic pressure assisting condition. Even if the hydraulic pressure assisting portion 50 fails, a large brake pressure is outputted and the effective braking force can be obtained. As the hydraulic pressure assisting portion 50 used in the device of the present embodiment, other devices such as a hydraulic pressure booster and a pressure regulator can be used.

In accordance with the present invention, the hydraulic brake device includes a hydraulic pressure generating device, an assisting device, and a valve device. The hydraulic pressure generating device includes a first piston for increasing the pressure of the brake fluid supplied from the reservoir into a first pressure chamber to supply brake pressure to a first set of the wheel cylinders in response to a brake pedal depression, and includes a second piston provided at the rear of the first piston and having a diameter larger than that of the first piston for increasing the pressure of the brake fluid supplied from the reservoir into a second pressure chamber between the first piston and the second piston to supply brake pressure to the second set of the wheel cylinders in response to the brake pedal depression. The assisting device is disposed at the rear of the second piston for assisting the actuation of the first and second pistons in response to the brake pedal depression. The valve device hydraulically closes the second pressure chamber from the reservoir when the actuation of each of the first and second pistons is assisted by the assisting device, and establishes hydraulic communication between the second pressure chamber and the reservoir when the assisting operation of the assisting device is not carried out. The first pressure chamber is hydraulically connected to the first set of wheel cylinders by a first brake pressure circuit, and the second pressure chamber is hydraulically connected to the second set of wheel cylinders by a second brake pressure circuit. Accordingly, the brake pedal stroke can be greatly reduced compared to the known device and the effective braking force can be assured when the assisting device fails. Further, the axial length of the device is much shorter than that of the known device.

Because the hydraulic brake device is configured as explained above, the front wheels which receive a larger braking force are not connected directly with the assisting device. Accordingly, a more effective brake force can be assured in the event the assisting device should fail.

The valve device as explained above can be configured in the second piston and effective input-output characteristics can be achieved without a complicated control system.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake device for a vehicle comprising;

a reservoir for storing brake fluid;

first and second sets of wheel cylinders operatively associated with wheels of the vehicle;

a hydraulic pressure generating device that includes a first piston for increasing a pressure of the brake fluid supplied from the reservoir to a first pressure chamber to supply brake pressure to the first set of wheel cylinders in response to a brake pedal depression, and a second piston provided rearwardly of the first piston and having a diameter larger than that of the first piston for increasing the pressure of the brake fluid supplied from the reservoir into a second pressure chamber located between the first piston and the second piston to supply brake pressure to the second set of wheel cylinders in response to the brake pedal depression;

an assisting device provided rearwardly of the second piston for assisting actuation of the first and second pistons in response to the brake pedal depression;

a valve device for hydraulically closing the second pressure chamber from the reservoir when the actuation of each of the first and second pistons is assisted by the assisting device, and for establishing hydraulic communication between the second pressure chamber and the reservoir when the assisting operation of the assisting device is not carried out;

a first brake pressure circuit hydraulically connecting the first pressure chamber with the first set of wheel cylinders; and a second brake pressure circuit hydraulically connecting the second pressure chamber with the second set of wheel cylinders.

2. The hydraulic brake device according to claim 1, wherein the first set of wheel cylinders includes a wheel cylinder operatively associated with a front right wheel of the vehicle and a wheel cylinder operatively associated with a front left wheel of the vehicle, and the second set of the wheel cylinders includes a wheel cylinder operatively associated with a rear right wheel of the vehicle and a wheel cylinder operatively associated with a rear left wheel of the vehicle.

3. The hydraulic brake device according to claim 1, wherein the valve device is located in the second piston at an axial center of the second piston.

4. The hydraulic brake device according to claim 1, wherein the assisting device is a vacuum booster that includes a housing having an interior divided by a movable wall into a constant pressure chamber and a variable pressure chamber.

5. The hydraulic brake according to claim 1, including:

an auxiliary hydraulic pressure source; and the assisting device is a hydraulic booster that includes a power chamber for driving the second piston in a forward direction and a spool valve provided in the second piston for controlling fluid communication between the power chamber and the auxiliary pressure source and for controlling fluid communication between the power chamber and a drain port connected with the reservoir to regulate a pressure in the power chamber in response to the brake pedal depression.

6. The hydraulic brake device according to claim 5, including:
   a hydraulic passage through which hydraulic pressure outputted from the auxiliary hydraulic pressure source is introduced into a power chamber of the hydraulic booster without passing through the spool valve device;
   a normally-closed type valve disposed in the hydraulic passage; and
   a normally-open type valve disposed in a hydraulic passage connecting the drain port of the hydraulic booster with the reservoir.

7. The hydraulic brake device according to claim 1, including:
   a hydraulic passage formed in the second piston for connecting the second pressure chamber with the reservoir; and
   the valve device including a valve seat disposed in the hydraulic passage, a valve body adapted to be seated on or separated from the valve seat for closing or opening the hydraulic passage, a first biasing member always biasing the valve body toward the valve seat, a brake input transmitting member for driving the valve body in response to the brake pedal depression when the assisting operation of the assisting device is not carried out, a shock absorbing member engaged with the brake input transmitting member and arranged to be in contact with the valve body, and a second biasing member always biasing the shock absorbing member toward the valve body with a biasing force larger than that of the first biasing member.

8. The hydraulic brake device according to claim 1, including:
   a hydraulic passage formed in a cylinder which accommodates the first piston and the second piston for connecting the second pressure chamber with the reservoir; and
   the valve device is a normally-open type check valve that is operated in response to a pressure differential between the second pressure chamber and the reservoir.

9. The hydraulic brake device according to claim 1, including:
   an annular member supporting the first piston and positioned in a cylinder which accommodates the first piston and the second piston; and
   a pair of cup-shaped sealing members provided at the front and at the rear sides of the annular member in order to seal between an outer periphery of the first piston and the cylinder.

10. A hydraulic brake device for a vehicle comprising;
    a reservoir for storing brake fluid;
    a first set of wheel cylinders operatively associated with a pair of front wheels of the vehicle;
    a second set of wheel cylinders operatively associated with a pair of rear wheels of the vehicle;
    a hydraulic pressure generating device that includes a first pressure chamber adapted to be communicated with the first set of wheel cylinders, a second pressure chamber adapted to be communicated with the second set of wheel cylinders and positioned rearwardly of the first pressure chamber, a first piston which increases a pressure of the brake fluid supplied from the reservoir to the first pressure chamber during movement of the first piston, and a second piston positioned rearwardly of the first piston and having a diameter larger than that of the first piston which increases the pressure of the brake fluid supplied from the reservoir to the second pressure chamber during movement of the first piston, the second pressure chamber being located between the first and second pistons;
    an assisting device provided rearwardly of the second piston for assisting actuation of the first and second pistons;
    a valve device which prevents hydraulic communication between the second pressure chamber and the reservoir when the actuation of each of the first and second pistons is assisted by the assisting device, and establishes hydraulic communication between the second pressure chamber and the reservoir non-operation of the assisting device;
    a first brake pressure circuit hydraulically connecting the first pressure chamber with the first set of wheel cylinders; and
    a second brake pressure circuit hydraulically connecting the second pressure chamber with the second set of wheel cylinders.

11. The hydraulic brake device according to claim 10, wherein the valve device is located in the second piston.

12. The hydraulic brake device according to claim 10, wherein the assisting device is a vacuum booster that includes a housing having an interior divided by a movable wall into a constant pressure chamber and a variable pressure chamber.

13. The hydraulic brake device according to claim 10, including an auxiliary hydraulic pressure source that comprised of a pump, an electric motor connected to the pump to drive the pump and an accumulator positioned at a discharge side of the pump.

14. The hydraulic brake device according to claim 10, wherein the assisting device is a hydraulic booster comprised of a power chamber which drives the second piston in a forward direction, and a spool valve in the second piston which controls fluid communication between the power chamber and the auxiliary pressure source and controls fluid communication between the power chamber and a drain port connected with the reservoir to regulate a pressure in the power chamber in response to brake pedal depression.

15. The hydraulic brake device according to claim 10, wherein the second piston includes a hydraulic passage extending between the second pressure chamber and the reservoir.

16. The hydraulic brake device according to claim 15, wherein the valve device includes a valve seat disposed in the hydraulic passage, a valve body adapted to be seated on or separated from the valve seat for closing or opening the hydraulic passage, a first biasing member always biasing the valve body toward the valve seat, and a brake input transmitting member for driving the valve body in response to the brake pedal depression during non-operation of the assisting device.

17. The hydraulic brake device according to claim 16, wherein the valve device also includes a shock absorbing member engaged with the brake input transmitting member and adapted to contact the valve body, and a second biasing member always biasing the shock absorbing member toward the valve body with a biasing force larger than that of the first biasing member.

18. The hydraulic brake device according to claim 10, wherein the first and second pistons are positioned in a cylinder, and including a hydraulic passage formed in the cylinder and extending between the second pressure chamber and the reservoir, the valve device being a normally-open type check valve which is opened in response to a pressure differential between the second pressure chamber and the reservoir.

19. The hydraulic brake device according to claim 10, wherein the assisting device is a hydraulic booster that includes a power chamber which drives the second piston in a forward direction, and including a hydraulic passage through which hydraulic pressure outputted from the auxiliary hydraulic pressure source is introduced into the power chamber of the hydraulic booster, and a normally-closed type valve disposed in the hydraulic passage.

20. The hydraulic brake device according to claim 10, wherein the first and second pistons are accommodated in a cylinder, and including an annular member positioned in the cylinder and supporting the first piston, and a pair of sealing members positioned forwardly and rearwardly of the annular member to provide a fluid-tight seal between an outer periphery of the first piston and the cylinder.

* * * * *